US012647316B2

(12) United States Patent
Rathi et al.

(10) Patent No.: US 12,647,316 B2
(45) Date of Patent: Jun. 2, 2026

(54) LINEAGE-BASED CLASSIFICATION OF NETWORK EVENTS

(71) Applicant: HEWLETT PACKARD ENTERPRISE DEVELOPMENT LP, Spring, TX (US)

(72) Inventors: Mansi Rathi, Spring, TX (US); Sargam Jain, Spring, TX (US); Jose Tellado, Santa Clara, CA (US); David Fehling, Jr., Spring, TX (US); Sayed Mahmood Hoseini Faradonbeh, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/930,439

(22) Filed: Oct. 29, 2024

(65) Prior Publication Data

US 2026/0121914 A1 Apr. 30, 2026

(51) Int. Cl.
*H04L 41/0686* (2022.01)

(52) U.S. Cl.
CPC ................................ *H04L 41/0686* (2013.01)

(58) Field of Classification Search
CPC . H04L 43/16; H04L 41/0677; H04L 41/0681; H04L 43/0811; H04L 41/0654; H04L 41/22; H04L 41/0631; H04L 43/0817; H04L 41/069; H04L 41/0686; H04L 709/224; H04L 709/223; H04L 370/242; H04L 370/216; H04L 714/57; H04L 370/252
See application file for complete search history.

(56) References Cited

U.S. PATENT DOCUMENTS

| | | | | |
|---|---|---|---|---|
| 11,037,236 B1 * | 6/2021 | Ram | ..................... | G06Q 20/403 |
| 11,496,386 B2 * | 11/2022 | Ansari | ..................... | H04L 41/06 |
| 11,863,585 B2 * | 1/2024 | Wang | ..................... | G06F 18/22 |
| 12,367,442 B2 * | 7/2025 | Kearns | ..................... | G06Q 10/0637 |
| 2003/0050546 A1 * | 3/2003 | Desai | ................. | A61B 5/14532 |
| | | | | 600/347 |
| 2004/0109256 A1 * | 6/2004 | Honjo | ................. | G11B 15/4676 |

(Continued)

OTHER PUBLICATIONS

Chou, P. A., "Optimal Partitioning for Classification and Regression Trees," Apr. 1991, IEEE Transactions on Pattern Analysis & Machine Intelligence, vol. 13, No. 4, https://www.computer.org/csdl/journal/tp/1991/04/10340/13rRUxDqS9f.

*Primary Examiner* — Ninos Donabed
(74) *Attorney, Agent, or Firm* — Dickinson Wright

(57) ABSTRACT

Systems and methods are provided for lineage-based analysis of network issues. For example, the system can identify groups or clusters of devices that share common features or are experiencing common connection issues. Using the clusters, the system may create a timeline or "lineage" of the events that these clusters are experiencing. The system can generate an assessment of the clusters in incremental analysis over a time series of data (e.g., 5-minute datasets) that show events experienced by the devices in each cluster. The analysis over time may help determine whether the clusters/issues belong to an ongoing/persistent issue or a new issue that needs to be addressed. The system may initiate an action for the new lineage and restrict actions for the persistent lineages.

16 Claims, 9 Drawing Sheets

(56) References Cited

U.S. PATENT DOCUMENTS

| | | | |
|---|---|---|---|
| 2009/0168645 A1* | 7/2009 | Tester | H04L 41/0677 |
| | | | 370/252 |
| 2013/0017622 A1* | 1/2013 | Rahn | G01N 21/553 |
| | | | 422/69 |
| 2015/0095060 A1* | 4/2015 | Jennewine | A61B 5/743 |
| | | | 705/2 |
| 2015/0301521 A1* | 10/2015 | Byron | G05B 19/4183 |
| | | | 700/108 |
| 2017/0209102 A1* | 7/2017 | Parthasarathy | A61B 5/0059 |
| 2018/0102938 A1* | 4/2018 | Yoon | G06F 16/358 |
| 2019/0317834 A1* | 10/2019 | Ebrahimi | G06F 17/18 |
| 2021/0318915 A1* | 10/2021 | Wang | H04N 21/658 |
| 2022/0159347 A1* | 5/2022 | Froehlich | H04N 21/64738 |
| 2023/0092764 A1* | 3/2023 | El Ferkouss | H04W 84/12 |
| | | | 370/329 |
| 2024/0155378 A1* | 5/2024 | Chawla | H04W 24/02 |
| 2025/0088410 A1* | 3/2025 | Breitenbach | H04L 41/12 |

* cited by examiner

| | Entity type 410 | Current entities 420 | Past entities 430 | Overlap 440 | Hyper-parameter 450 | Lineage 460 |
|---|---|---|---|---|---|---|
| 402 | Stable | [Server1, Server2, Server3, Server4, Server5, Server6] | [Server1, Server7] | 16% | T1 >= 20% | New |
| 404 | Moving | [Client1, Client2, Client3] | [Client1] | 33% | T2 >= 5% | Persisting |
| 406 | Stable, moving | [Server1, Client1, Client2, Client3, Client4] | [Server1, Client5] | 100% | T1 >= 20% | Persisting |

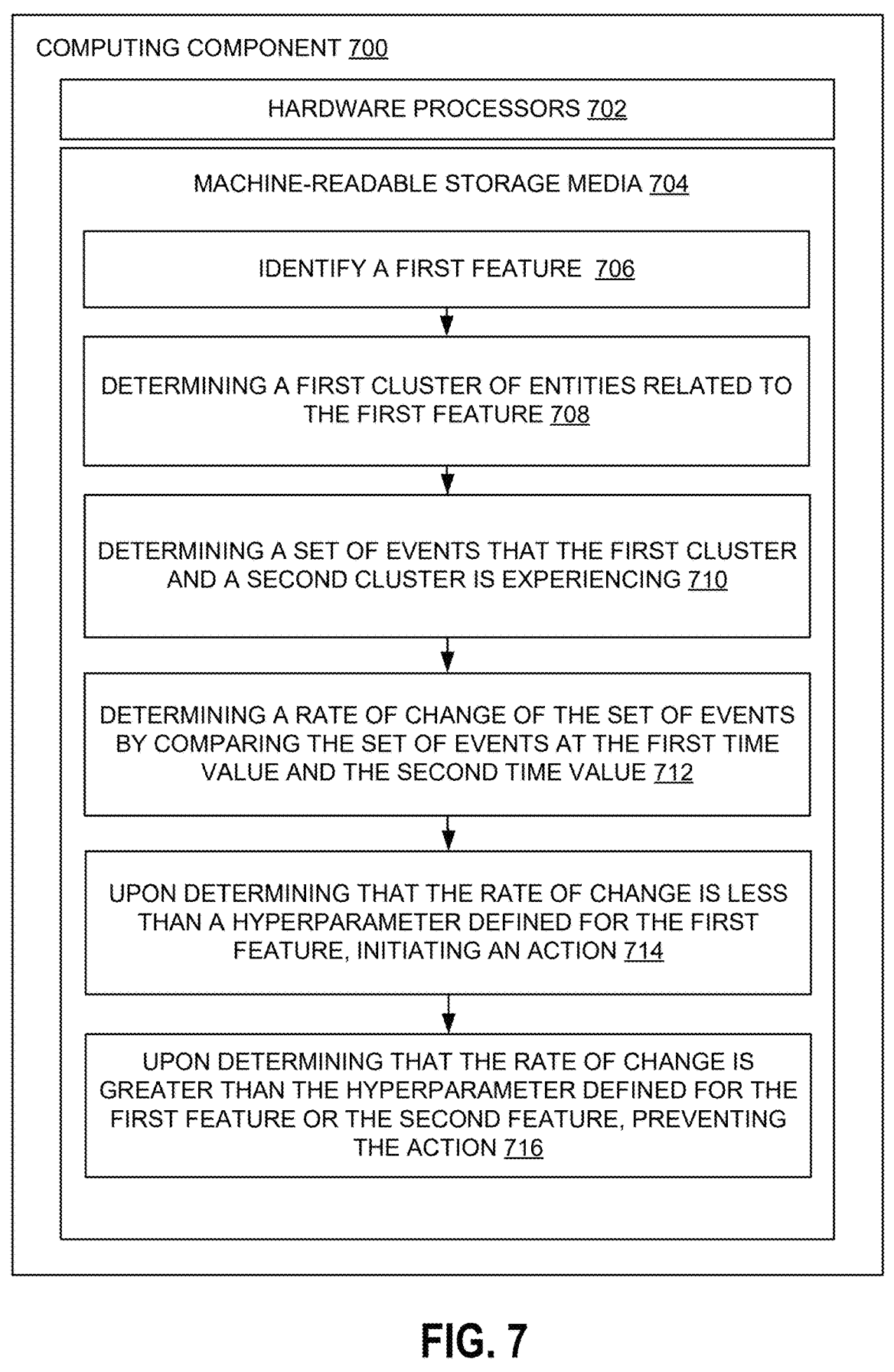

COMPUTING COMPONENT 700

HARDWARE PROCESSORS 702

MACHINE-READABLE STORAGE MEDIA 704

IDENTIFY A FIRST FEATURE  706

↓

DETERMINING A FIRST CLUSTER OF ENTITIES RELATED TO THE FIRST FEATURE 708

↓

DETERMINING A SET OF EVENTS THAT THE FIRST CLUSTER AND A SECOND CLUSTER IS EXPERIENCING 710

↓

DETERMINING A RATE OF CHANGE OF THE SET OF EVENTS BY COMPARING THE SET OF EVENTS AT THE FIRST TIME VALUE AND THE SECOND TIME VALUE 712

↓

UPON DETERMINING THAT THE RATE OF CHANGE IS LESS THAN A HYPERPARAMETER DEFINED FOR THE FIRST FEATURE, INITIATING AN ACTION 714

↓

UPON DETERMINING THAT THE RATE OF CHANGE IS GREATER THAN THE HYPERPARAMETER DEFINED FOR THE FIRST FEATURE OR THE SECOND FEATURE, PREVENTING THE ACTION 716

FIG. 7

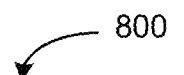
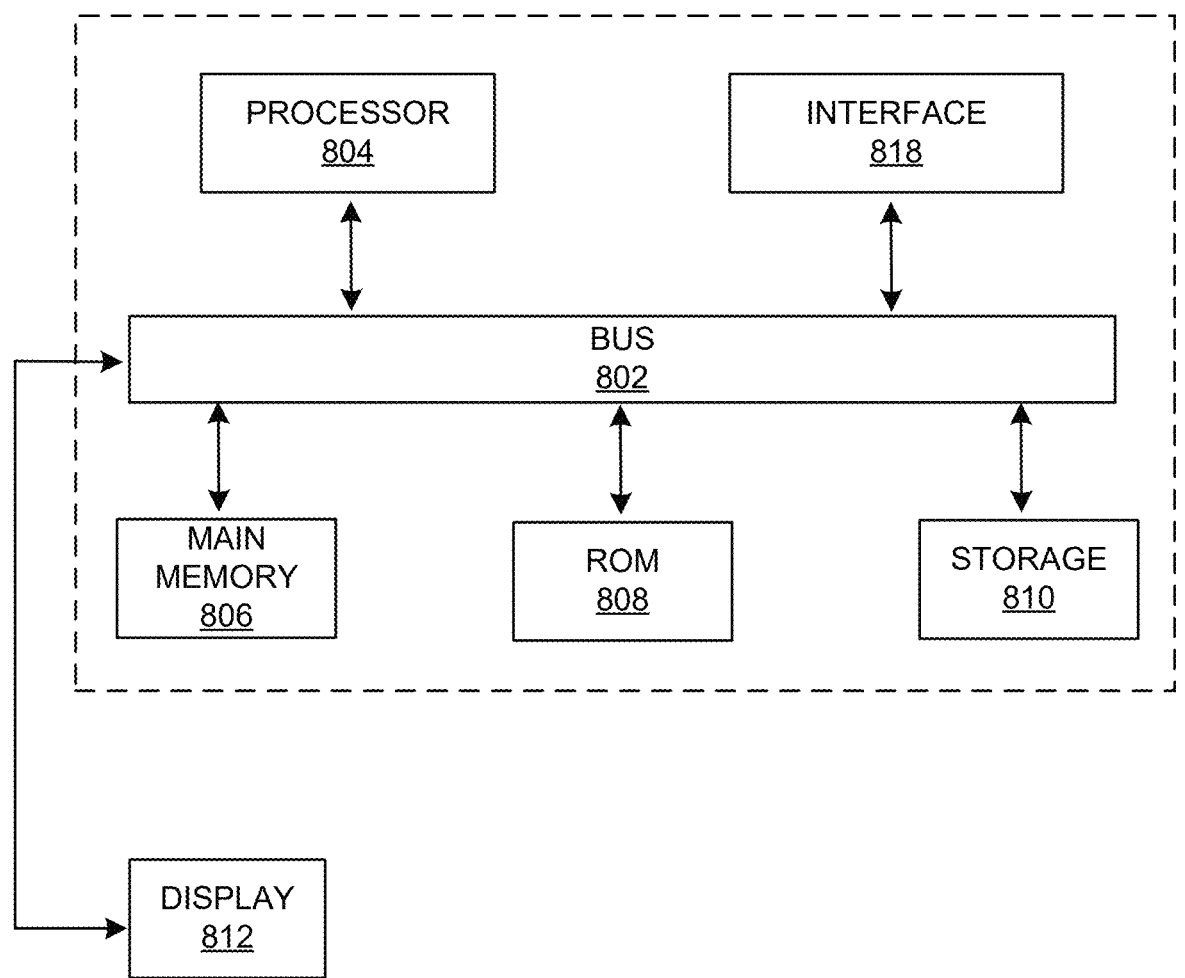
FIG. 8

LINEAGE-BASED CLASSIFICATION OF NETWORK EVENTS

BACKGROUND

Traditional computer networks consist of network topologies defined by various types of entities that use communication protocols, enabling client devices such as phones, laptops, computers, internet of things (IoT) devices, and others to connect to the network. Each network deployment has a distinct topology with a specific combination of involved entities, including but not limited to switches, access points, gateways, service set identifiers, different connectivity servers, and multiple network configurations. These topologies can be wired, wireless, or hybrid, combining both wired and wireless connections.

A network connection goes through multiple stages of connectivity (association, authentication, DHCP, DNS etc.) to achieve successful communication by using the various entities present in the topology. These networks may experience connectivity failures over time.

BRIEF DESCRIPTION OF THE DRAWINGS

The present disclosure, in accordance with one or more examples, is described in detail with reference to the following figures. The figures are provided for illustrative purposes only and merely depict typical, non-limiting aspects of such examples.

FIG. 4 illustrates a lineage-based classification of failures detected over a time window on basis of different types of network entities involved and their precise identity, in accordance with some examples of the disclosure.

FIG. 7 is a block diagram of example computing component that may be used to implement various features of a set of models in accordance with examples discussed herein.

FIG. 8 is a computer system that may be used to implement examples of the disclosed technology.

Figure 1:
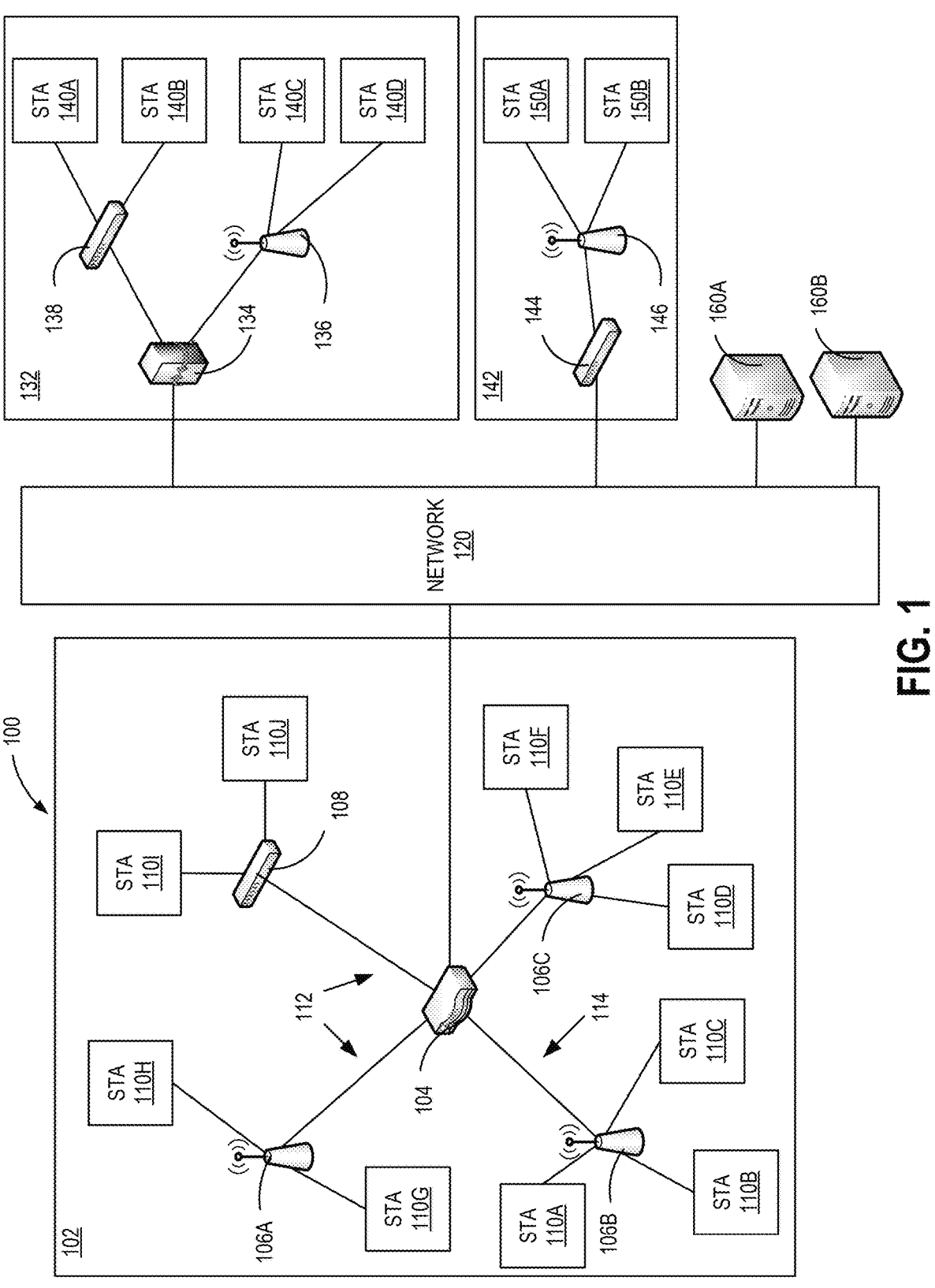
FIG. 1 illustrates an example schematic representation of network topologies across different deployments that may be implemented for an organization, such as a business, educational institution, governmental entity, healthcare facility, or other organization.

The figures are not exhaustive and do not limit the present disclosure to the precise form disclosed.

DETAILED DESCRIPTION

The complex networks, with multiple entities involved in various combinations across different topologies, present a challenging task to troubleshoot and detect failures. This is particularly difficult as the mix of different client devices and involved entities can change over time or relocate within the network deployment. Network issues/failures can be short-lived, intermittent, or continuous, which adds to the complexity of troubleshooting across these entities. A central controller can be implemented in the network to facilitate these connections between devices and detect any failures that arise in the network.

Examples of the disclosure improve traditional systems by implementing a time-based analysis of detected issues and highlighting issues that require attention. For example, in relation to network communications, traditional systems can attempt to identify the root cause of connection issues within the network topology and determine potential mitigation strategies. The system may identify groups or clusters of entities that share common features or experience common connection issues. In some cases, these groups of entities are clustered using a greedy search root-cause algorithm that explores a set of possible combinations of network entities involved in a particular network deployment.

Once clusters of devices are identified, the improved system may create a timeline or "lineage" of events that these clusters are experiencing. For instance, the system may determine common features in each cluster over time and reference a lineage that shows similar features. The system may then match additional clusters of network devices based on these shared features to form a lineage for an ongoing issue. If a second set of entities is experiencing a similar sequence of events as the first set and both share similar features, the system can group these sets into a larger cluster of devices and determine that there is a shared issue based on the common features over the time period. The system can generate an assessment of the network clusters using incremental analysis over a time series of data (e.g., 5-minute datasets) that shows failures or events experienced across the network devices. Lineages are created over time by analyzing the features of failures detected in the system.

The time-based analysis helps determine whether the detected clusters belong to an ongoing issue or a new issue that requires attention. For example, the system may classify the issues into two categories: part of an existing problem (i.e., an ongoing lineage that has been occurring for a set number of hours) or part of a new problem with its own unique lineage. This classification allows an analysis of the issues over time that are affecting similar clusters of network entities and aide in issue spotting, especially when new lineages are identified. Each failure detected includes the identity of network entities that are experiencing the issue. The failure detected can either be a new lineage, or a persistent lineage for an ongoing problem that does not require repeated notification.

Once the lineages are determined and analyzed, the system may initiate actions based on the lineages, hyperparameters, and threshold values. For example, the system may update a user interface to display lineage information, distinguishing between "new" and "persistent" issues. The user interface may also present other failure event details, including root causes or a recommendation engine for resolving the issue.

Several technical improvements are introduced throughout the application. For example, the system differentiates between new and persistent lineages to reduce the number of alerts in the user interface for ongoing failures. When an issue is persistent, a failure alert may have already been sent within a set time frame, preventing redundant alerts. This process increases visibility for new issues in the network and derives actionable insights from the lifetime of ongoing problems. Additionally, the system can leverage historical data to refine alerts, improving accuracy in identifying faulty network elements. This enhances the user experience and ensures more precise data.

Before describing various examples of the disclosed systems and methods in detail, it is useful to describe an example network installation with which these systems and methods might be implemented. FIG. 1 illustrates an example schematic representation of network topologies across different deployments that may be implemented for an organization, such as a business, educational institution, governmental entity, healthcare facility, or other organization. FIG. 1 depicts with multiple users (or at least multiple client devices 110) and possibly multiple physical or geographical sites 102, 132, 142. Network configuration 100 may include primary site 102 in communication with network 120. Network configuration 100 may include a primary site 102 in communication with network 120, as well as one or more remote sites 132, 142 that also communicate with network 120. A cluster of entities may exist at any of the physical or geographical sites 102, 132, 142, where the entities share some common feature. For example, one feature could be the location of the entity, although this should not be seen as limiting.

Primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, primary site 102 includes controller 104, which is in communication with network 120. Controller 104 may provide communication with network 120 for primary site 102. There may be other points of communication with network 120 for primary site 102 in addition to controller 104. Although single device associated with controller 104 is illustrated, primary site 102 may include multiple controllers and/or multiple communication points with network 120. In some examples, controller 104 may communicate with network 120 through a router. In other examples, controller 104 provides router functionality to the devices in primary site 102. In this specification, the word "tunnel" refers to an encapsulated mode of transporting data between AP and controller.

Controller 104 may be operable to configure and manage network devices, such as at primary site 102, and may also manage network devices at remote sites 132, 142. Controller 104 may be operable to configure and/or manage switches, routers, access points, and/or client devices connected to a network. Controller 104 may itself be, or provide the functionality of, an Access Point (AP).

Controller 104 may be in communication with one or more switches 108 and/or wireless Access Points (APs) 106a-c. Switches 108 and wireless APs 106a-c provide network connectivity to various client devices 110a-j. Using a connection to switch 108 or AP 106a-c, client device 110a-j may access network resources, including other devices on the (primary site 102) network and network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and similar devices.

Within primary site 102, switch 108 is included as one example of a point of access to the network established in primary site 102 for wired client devices 110i-j. Client devices 110i-j may connect to switch 108 and through switch 108, may be able to access other devices within network configuration 100. Client devices 110i-j may also be able to access network 120, through switch 108. Client devices 110i-j may communicate with switch 108 over a wired or wireless connection 112. In the illustrated example, switch 108 communicates with controller 104 over a wired or wireless connection 112.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the example of FIG. 1, APs 106a-c can be managed and configured by controller 104. APs 106a-c communicate with controller 104 and the network over connections 112, which may be either wired or wireless interfaces.

Network configuration 100 may include one or more remote sites 132. Remote site 132 may be located in a different physical or geographical location from primary site 102. In some cases, remote site 132 may be in the same geographical location, or possibly the same building, as primary site 102, but lacks a direct connection to the network located within primary site 102. Instead, remote site 132 may utilize a connection over a different network, e.g., network 120. Remote site 132 such as the one illustrated in FIG. 1 may be a satellite office, another floor or suite in a building, for example. Remote site 132 may include gateway device 134 for communicating with network 120. Gateway device 134 may be a router, a digital-to-analog modem, a cable modem, a digital subscriber line (DSL) modem, or some other network device configured to communicate with network 120. Remote site 132 may also include switch 138 and/or AP 136 in communication with gateway device 134 over either wired or wireless connections. Switch 138 and AP 136 provide connectivity to the network for various client devices 140a-d.

In various examples of the disclosure, the set of events involving entities associated with clusters relates to communication issues over network 120. For instance, one cluster of entities may comprise stationary server devices in network 120 using wired communications, whereas another cluster may comprise mobile devices that move within network 120 and use wireless communications. In either case, events affecting the cluster of device entities may involve local or network-wide issues associated with network 120.

In some examples, remote site 132 may directly communicate with primary site 102, such that client devices 140a-d at remote site 132 access the network resources at primary site 102 as if these client devices 140a-d were located at primary site 102. In such examples, remote site 132 is managed by controller 104 at primary site 102, and controller 104 provides the necessary connectivity, security, and accessibility that enable the connection between remote site 132 and primary site 102. Once connected to primary site 102, remote site 132 may function as a part of a private network provided by primary site 102.

In various examples, network configuration 100 may include one or more smaller remote sites 142, comprising gateway device 144 for communicating with network 120 and wireless AP 146, by which various client devices 150*a-b* access network 120. Examples of remote site 142 may represent, for example, an individual employee's home or a temporary remote office. Remote site 142 may also be in communication with primary site 102, such that client devices 150*a-b* at remote site 142 access network resources at primary site 102 as if these client devices 150*a-b* were located at primary site 102. Remote site 142 may be managed by controller 104 at primary site 102 to make this transparency possible. Once connected, remote site 142 may function as a part of a private network provided by primary site 102.

Network 120 may be a public or private network, such as the Internet, or other communication network to allow connectivity among various sites 102, 132, 142 as well as access to servers 160*a-b*. Network 120 may include third-party telecommunication lines, such as phone lines, coaxial cables, fiber optic cables, satellite communications, cellular communications, and the like. It may also include various intermediate network devices, such as switches, routers, gateways, servers, and controllers, that are not directly part of network configuration 100 but facilitate communication between different parts of network configuration 100, and between network configuration 100 and other network-connected entities. Network 120 may also include servers 160*a-b*. For example, servers 160*a-b* may comprise content servers that offer multimedia content, including downloadable and streaming audio, video, graphical, and/or text content. Examples of content servers 160*a-b* include web servers, streaming radio and video providers, and cable and satellite television providers. Client devices 110*a-j*, 140*a-d*, 150*a-b* may request and access the multimedia content provided by content servers 160*a-b*.

In another example, servers 160*a-b* may comprise flow optimization service server that include various information for provisioning services to client devices 110 *a-j*, 140*a-d*, 150*a-b* and optimizing traffic flows in accordance with the examples disclosed herein. Access points 106*a-c*, 136, and 146; switches 108; and gateway devices 134 and 144 may request or upload information, such as telemetry data, for optimizing rendering of services to client devices 110*a-j*, 140*a-d*, 150*a-b*. The information may include, but is not limited to, a measure or estimate of QoE on a per traffic flow basis (e.g., referred to herein as a QoE score); flow characteristics and other QoS measurements, such as but not limited to, jitter, delay, airtime, latency, etc.; analytics; transmission protocols (e.g., OFDMA and MU-MIMO), and the like. The information may be stored in a database, which can be communicatively coupled to servers 160*a*, 160*b*. In examples, servers 160*a-b* may be cloud-based, which would be understood by those of ordinary skill in the art to refer to being, e.g., remotely hosted on a system/servers in a network (rather than being hosted on local servers/computers) and remotely accessible.

Figure 2:
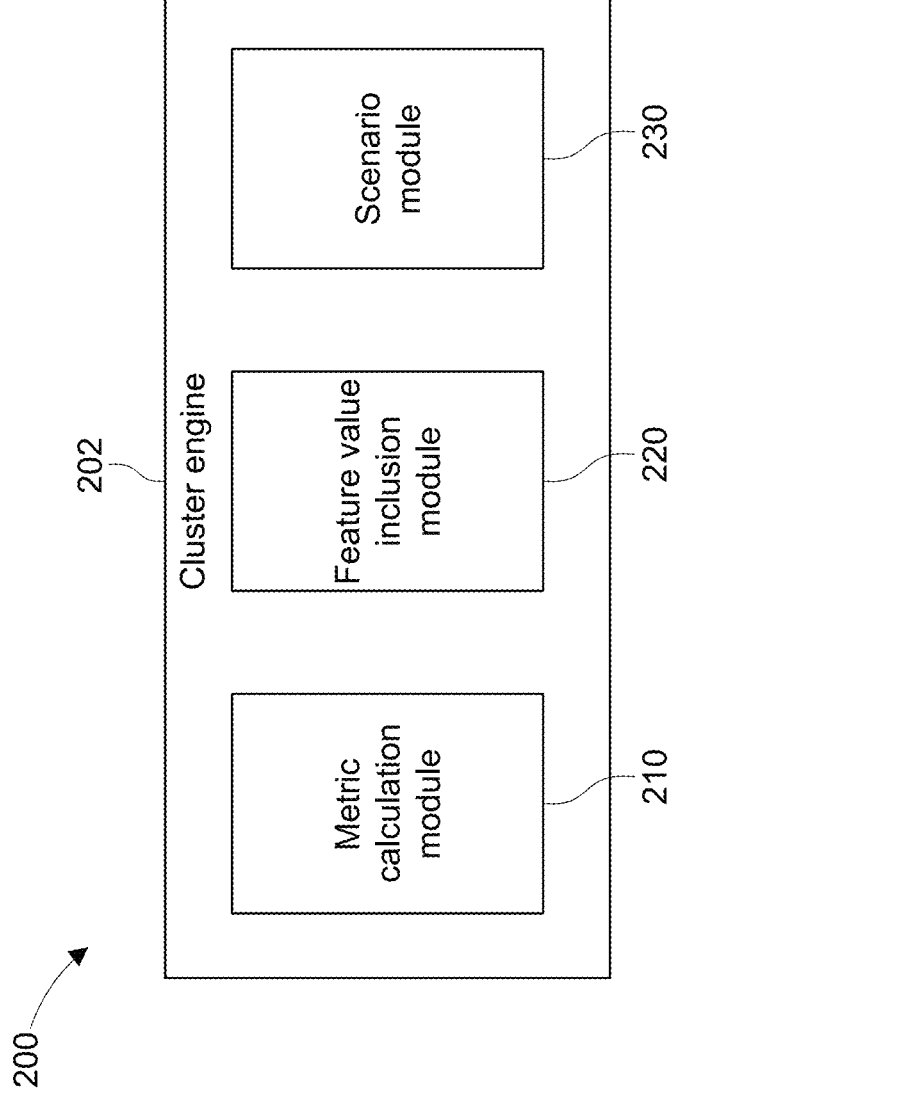
FIG. 2 illustrates a cluster engine of controller, in accordance with some examples of the disclosure.

FIG. 2 illustrates a cluster engine of controller, in accordance with some examples of the disclosure. In example 200, cluster engine 202 may be implemented as an engine at controller 104 in FIG. 1. In some examples, cluster engine 202 may associate devices based on a common feature shared by the devices. The cluster of devices may share one or more common feature values. The feature common among the entities may be used in identifying a new cluster or adding entities to an existing cluster. In some examples, cluster engine 202 may comprise metric calculation module 210, feature value inclusion module 220, and scenario module 230.

Metric calculation module 210 may be configured to calculate a metric value which may be in the form of a score that represents the estimated value that a feature of the entity will affect performance metrics. The score calculated for a combination may reflect how much network traffic resulting in a certain outcome (e.g., performance metric) is associated with the combination rather than with other combinations. For instance, using a failure condition as an example of the performance metrics, the score may be calculated based on how many of the attempts result in a failure condition using failure rate and failure fraction.

The failure rate may be defined as total failures associated with the combination in relation to a total number of attempts associated with the combination. An example formula for the failure rate is provided below:

$$failure rate = \frac{total failures of the combination}{total attempts of the combination} \qquad \text{(Eq. 1)}$$

The failure fraction may be defined as a total number of failures associated with a specific combination in relation to a total number of failures in a dataset (e.g., the example dataset). An example formula for the failure fraction is provided below:

$$failure fraction = \frac{total failures of the combination}{total failures of the dataset} \qquad \text{(Eq. 2)}$$

Metric calculation module 210 may calculate a score for a specific combination based on a rate and a fraction. The score may be indicative of how much the combination contributes to the performance metric. Various methodologies may be used to calculate the score. In one example implementation, the score may be calculated as a harmonic mean of the rate and the fraction. For example, the score may be calculated with a harmonic mean score formula provided below:

$$score = \frac{2 * rate * fraction}{fraction + rate} \qquad \text{(Eq. 3)}$$

In some example implementations, the score may be weighted to account for a tradeoff between the fraction and the rate. An example formula that provides such weighting is provided below:

$$score\_beta = \frac{(1 + \beta^2) * rate * fraction}{(\beta^2 * rate) + fraction} \qquad \text{(Eq. 4)}$$

In the above formula, a weighting factor $\beta$ value less than 1 gives more weight to the rate term and adjusts the score (i.e., "score_beta" is a weighted score).

Metric calculation module 210 may receive feature vectors associated with each feature of the entities and the feature values. The feature vectors may be used to filter a dataset based on a feature value or a combination of multiple feature values. A filter in this example implementation may be a combination used to condition the original dataset and create a filtered dataset that is a subset of the original dataset. Score may be calculated for the filtered datasets which is the score of the combination.

For example, assume that feature vectors in an example dataset has 3 features, each with 3, 1, and 2 respective feature values. The example of features in the dataset may be represented as {'feature_1':{A, B, C}, feature_2':{D}, feature_3':{E, F}}. In the example dataset, there are 63 possible combinations of feature values which may be expressed as {{A}, {B}, {C}, {D}, {E}, {F}, {A,B}, {A,C}, . . . , {A,F}, {B,C}, . . . , {A, B, C, D, E, F}}. When the example dataset is filtered with a feature value "A", the filtered dataset only has value of "A" for 'feature_1'. A score may be calculated using Eq. 3 or Eq. 4 for a filtered dataset. Similarly, a score may be calculated for each of the 63 filtered datasets that represent possible combinations.

The scores may provide meaningful insights into how strongly a feature value or a combination of feature values is correlated with one or more specific performance metrics. In some implementations, the combination of feature values may extend beyond adjacent values in the sorted list. This approach allows the clustering process to capture combinations that would otherwise be missed.

It is noted that the above metrics of rate, fraction, and score may apply to other performance metrics, such as successes in network communications. Instead of searching for feature vectors that are associated with a failure condition, feature vectors may be combined such that they result in the maximum number of success conditions. Further, instead of a failure rate and a failure fraction, a success rate and a success fraction may be calculated. Calculating scores for the success conditions may provide insight into which scenario is the "best scenario" that is likely associated with fewest failures. Inspecting the best scenario and comparing it to the other feature values of the networks may give clues to why other feature values are having higher failures. For example, if only the best scenario involves a router updated to the latest firmware, this could suggest that updating other routers to the latest firmware might reduce failures.

Feature value inclusion module 220 may be configured to combine two or more feature values that, together, increase strength of correlation to one or more performance metrics. The combined feature values may provide a new combination that has stronger correlation to the performance metrics than the combinations that individually includes a constituent feature value.

In some implementations, feature value inclusion module 220 may utilize an algorithm to determine the combination of feature values (e.g., a scenario) that best correlates with a specific metric. For example, the algorithm may use a best-first search, greedy algorithm, hill-climbing algorithm, or another iterative search method to add feature values or associated entities to the cluster.

When a greedy algorithm is used, the greedy algorithm may add feature values one by one to a combination of feature values based on a determination that the feature values increase correlation to one or more performance metrics. For example, provided a dataset, the greedy algorithm may determine a "base score" for the entire dataset that represents correlation of the dataset to the performance metrics. The base score is a score of a combination that has all features and all feature values of all feature vectors. The greedy algorithm may select a feature value of a feature and generate a filtered dataset that must include all feature vectors comprising the selected feature value. The greedy algorithm then selects a feature value, filters the dataset to include only vectors with that value, and calculates a new score for the filtered dataset. If the new score exceeds the base score, it is determined that the feature value is strongly correlated with the performance metrics.

The greedy algorithm may then add a second feature value to the filter and generate a second filtered dataset. A second score is calculated, and if it exceeds the first score, the combination of feature values is determined to strengthen the correlation. If the second score is lower, the second feature value is excluded. This process repeats for other features, filtering the dataset and comparing scores to find the strongest correlations. The greedy algorithm keeps track of the combination of feature values that produces the highest score.

In the next iteration, the combination of feature values for a feature that resulted in the strongest correlation may be applied as a base filter to the dataset to generate a base filtered dataset. A new feature value of a different feature may be selected and applied as an additional filter to the base filtered dataset. A score is calculated for the resulting set and additional feature values of the different feature may be added to the additional filter until the score no longer increases. When the score is greater than a score calculated in the previous iteration, the greedy algorithm may replace a previous combination of feature values and a score from the previous iteration with a combination of the feature values associated with the different feature that resulted in the stronger correlation. The greedy algorithm may keep track of the updated combination and the updated score. Each of the other features are examined similarly to determine whether a combination of feature values corresponding to the other features may provide even stronger correlation (i.e., provides a greater score than the updated score). The greedy algorithm may keep track of whichever combination of feature values that provide the strongest correlation and a score for the combination.

In the next iteration, the combination of feature values in a feature that provides the strongest correlation in the previous iteration may be applied as a base filter to the dataset to generate a base filtered dataset. The greedy algorithm may then apply a similar process as in the previous iteration. It may keep track of the combination of feature values that provides the strongest correlation and a score for that combination.

In some implementations, the greedy algorithm may terminate when a new score, associated with the combination that provides the strongest correlation in the current iteration, converges with the previous score from the last iteration. Convergence may be determined based on a degree of closeness between the new score and the previous score. For example, the new score may be within a threshold value. Alternatively, the greedy algorithm may terminate after a set number of iterations. Once the algorithm terminates, the combination of feature values with the strongest correlation based on its score may be provided. This combination represents a "scenario" of network communications in the dataset that likely affects one or more performance metrics of the network. In some implementations, after the combination of feature values representing the scenario is identified, data related to this combination may be filtered out from the dataset, resulting in a dataset with feature vectors unassociated with the previously found combination.

Scenario module 230 may be configured to manage results of feature value inclusion module 220. Scenario module 230 may generate data structures suitable for reporting scenarios that have been determined. In some examples, the scenarios may correspond with clusters of entities that are selected to be analyzed for new lineages or persistent lineages, as described with FIG. 3.

Figure 3:
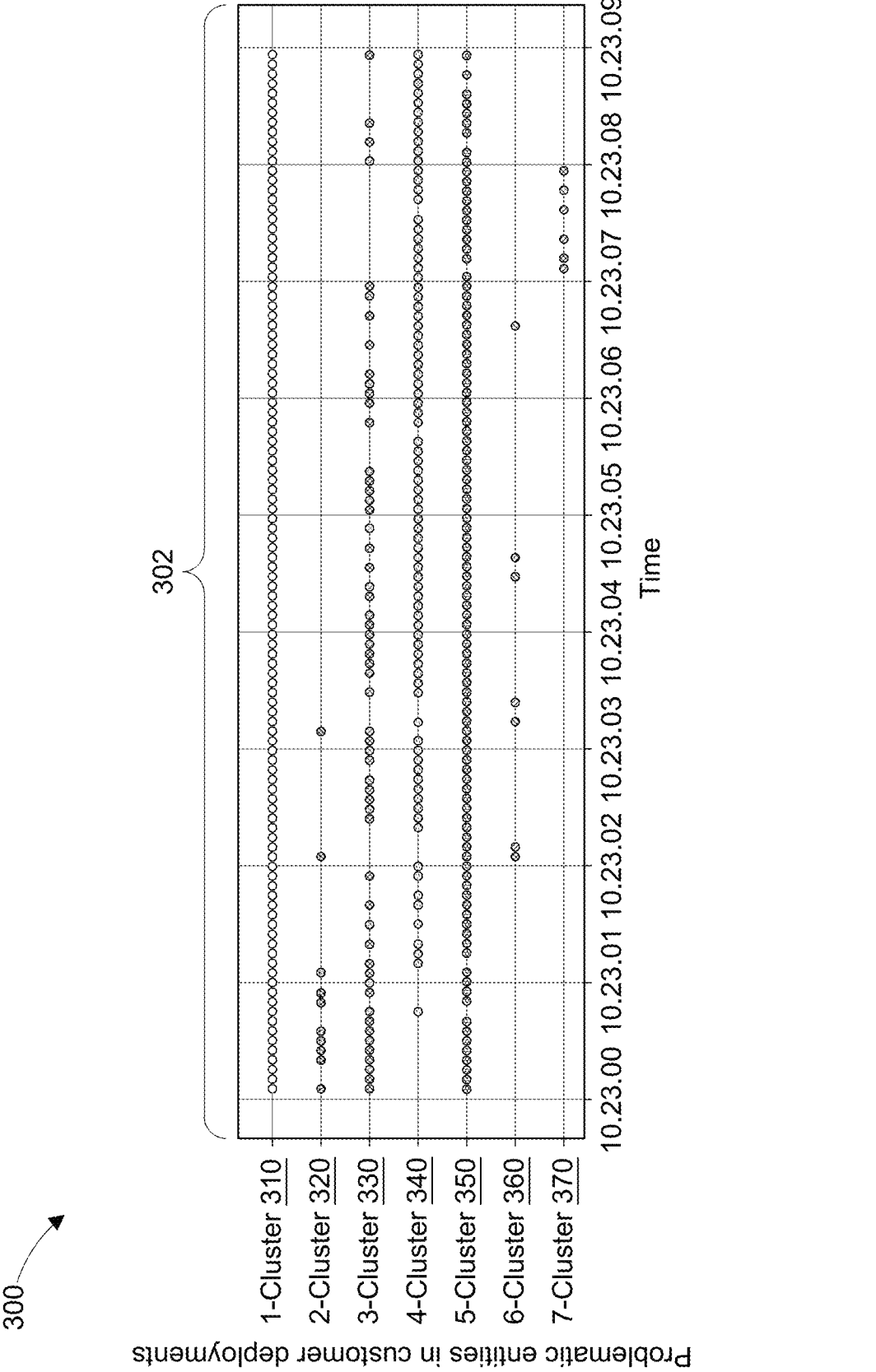
FIG. 3 provides illustrative examples of continuous, short-lived and intermittent lineages formed across identified problematic network entities, in accordance with some examples of the disclosure.

FIG. 3 provides illustrative examples of continuous, short-lived and intermittent lineages formed across identified problematic network entities, in accordance with some examples of the disclosure. In example 300, seven illustrative lineages are provided, including lineages 310, 320, 330, 340, 350, 360, 370. Lineages 310, 320, 330, 340, 350, 360, 370 show time series data identifying problematic events or issues that have been identified with a cluster of entities. The cluster of entities may comprise, for example, APs or other devices that are experiencing a common issue that have been grouped together using any of the methods described herein.

Using these identified device clusters, the system may create a timeline or "lineage" of the events affecting each cluster. For instance, the system may determine a common feature in each of the clusters and access a feature library that shows other similar features. The system may attempt to match other clusters based on the identified similar features. If the second cluster is experiencing a similar lineage of events as the first cluster, and both clusters share similar features, the system can determine that there is an issue between the similar clusters/features. The system can generate an assessment of the clusters from an incremental set of data (e.g., 5-minute datasets) detailing events experienced by the devices in each cluster. The system may analyze the clusters/issues over time using the event lineage.

This time-based analysis helps to determine whether the clusters/issues represent an ongoing problem or a new one. For instance, the issues may be classified into two groups: an ongoing issue (a persisting lineage lasting for N-hours) or a new problem (a new lineage). This classification allows an analysis of the issues over time that are affecting similar clusters and aide in issue spotting. Each alert can include the identity of entities that are experiencing the issue.

The distinction between the new lineage and the persisting lineage is determined by the rate of change in events across the lineage. The distinction between the new lineage and the persisting lineage is determined by the degree of commonality in the entities of the cluster. Various metrics may be implemented. For example, a persisting lineage may be created when events or clusters that have similar features (e.g., within a user-defined or system-defined degree of commonality above the defined hyperparameter), the events are within the N-hours, or if the degree of commonality in the entities of the clusters is above the hyperparameter. The hyperparameter could vary per stages of connectivity or based on the type of entities involved in the clusters. The type of entities is determined based on whether the entities are stationary/consistent or its location varies over time (e.g., moves in the network deployment).

Once the lineages are determined and analyzed, the system may initiate an action in response to identifying the lineages, including updating a user interface showing the lineage information or the lineage that is "new" versus "persistent" categories. An illustrative user interface is provided below, with the lineage information highlighted in green.

In example 300, set of events 302 illustrates time values when an event is identified and/or an alert is transmitted along the time series. In some examples, the time values associated with the time series are events occur in five-minute increments or other incremental value. The process may be iterative, so that the event is added to the time series along an incremental assessment of the computing environment.

In some cases, the data points in set of events 302 are identified using an outlier detection model. Devices or entities showing similar outlier behavior are grouped into a cluster. As this cluster experiences the same issue (shown as a feature of the cluster), the system may determine the rate of change of the set of events by comparing the cluster of entities or events across the time series. If the rate of change exceeds the defined hyperparameter for that feature, the set of events overtime may be classified as a persistent lineage. If the rate of change is below the define hyperparameter, the set of events overtime may be classified as a new lineage. For example, if an event is ongoing and detected at every time interval for an hour, the lineage of that event is considered persistent across the time series. In some cases, the system determines the rate of change by comparing the cluster of entities involved across the time series. When the rate of change exceeds a defined hyperparameter for a feature, the set of events may be a persistent lineage. When the rate of change is less than the hyperparameter, the set of events may be a new lineage. For example, an event detected at every time value for an hour may result in the event being classified as persistent across the time series.

At cluster 310, set of events 302 are substantially consistent across the time series of data, which illustrates a persisting lineage with a rate of change that exceeds a defined hyperparameter value. In this illustration, the event may be a communication issue that the cluster of devices are experiencing at the same time, and the system clusters the devices by the feature of having a similar and consistent communication issue.

In this example, the system may determine a hyperparameter value associated with the particular communication issue. The rate of change of entities in the cluster/set of events may be compared to the hyperparameter value and, in this case, may exceed the hyperparameter value because the issue is consistently identified across the time series of data. The set of events may correspond with a persistent lineage.

At cluster 320, set of events 302 are substantially consistent in a first portion of the time series and non-existent as time progresses. In this illustration, the event may be a communication issue, as seen in cluster 310, however, the communication issue may be resolved as time progresses as illustrated.

In this example, the time series illustrates a persisting lineage in the first portion and a new lineage in the second portion as the gap between the last two events is more than N-hours (e.g., 1 hour in this example).

At cluster 330, set of events 302 are substantially consistent at the beginning of the time series of data, yet appear inconsistently as time progresses.

At cluster 340, set of events 302 are inconsistent at the beginning of the time series and appear substantially consistent as time progresses.

At cluster 350, set of events 302 are substantially consistent throughout the time series of data. In this illustration, a few instances of the time series are missing, which show that the event did not occur in that time value.

At cluster 360, set of events 302 are inconsistent throughout the time series. In this example, the system may determine a hyperparameter or a threshold value associated with a particular issue that the cluster of entities is experiencing. The rate of change of the set of events may be compared to the hyperparameter value and, in this case, may be less than the parameter value because the issue is inconsistently identified across the time series of data. The set of events may correspond with a new lineage.

At cluster 370, set of events 302 are absent at the beginning of the time series of data and are inconsistent in a subsection of the time series of data.

FIG. 4 illustrates a lineage-based classification of failures detected over a time window on basis of different types of network entities involved and their precise identity, in accordance with some examples of the disclosure. In example 400, three illustrative scenarios are provided, including 402, 404, and 406. Scenarios 402, 404, and 406 show "clusters of entities" or "clusters of devices" (used interchangeably) that have been reviewed in a time progression and compared to a hyperparameter. Scenarios 402, 404, 406 may exist in time prior to an action being initiated or the action being prevented. In some examples, the clusters of entities are previously created and received by the system. The clusters may comprise the clusters and lineages determined using the processes illustrated at FIGS. 2-3.

Each scenario may comprise various types of data, including entity type 410, current entities at Time–1 ("T–1") 420, past entities at Time–0 ("T–0") 430, the percentage overlap between the entities 440, the comparison of the overlap with the hyperparameter value for the feature 450, and the determined type of lineage 460.

In some examples, T–0 (block 430) and T–1 (block 420) may be tuned using a machine learning model. For example, the hyperparameter may be defined for a specific feature and the hyperparameter may be updated based on implementing an inference stage of a trained machine learning model. The confidence value of the hyperparameter may be compared to a confidence value. When the hyperparameter value falls below a predetermined value, the hyperparameter value may be adjusted or tuned for future inferences.

Types of lineages 460 may comprise, for example, a persistent lineage or a new lineage. In a persistent lineage, the rate of change is determined by comparing the clusters/ number of entities at two different time points. This rate of change may be compared to the defined hyperparameter associated with the features of the entities in the cluster. When the rate of change is less than the hyperparameter, the cluster/event may correspond with the new lineage. If the rate of change is greater than the defined hyperparameter, the cluster/event may correspond to a persistent lineage.

In scenario 402, the entities involve stable entities (block 410). At T–0, two servers are present in the cluster (Server1, Server7) (block 430), and at T–1, six servers are in the cluster (Server1, Server2, Server3, Server4, Server5, Server6) (block 420). The overlap between T–0 and T–1 is 16% (block 440). In this example, the issue may correspond to a connection issue between servers, and the specific issue may be related to a hyperparameter of 20%. The overlap value is compared with the hyperparameter for that issue (e.g., 20% to identify a connection issue between servers) (block 450). The system may determine that a new lineage exists when the overlap value is less than the hyperparameter (block 460). The system can generate an alert or take other actions.

In scenario 404, the entities involved are mobile or moving entities (block 410). At T–0, one client/user is in the cluster (Client1) (block 430), and at T–1, three clients/users are in the cluster (Client1, Client2, Client3) (block 420). The overlap between T–0 and T–1 is 33% (block 440). In this example, the issue may correspond with a mobility/connection issue between client devices and the particular issue may correspond with a hyperparameter of 5%. The overlap value is compared with the defined hyperparameter for that issue (e.g., 5% to identify a mobility/connection issue between client devices) (block 450). The system may determine that a persistent lineage exists when the overlap value is greater than the defined hyperparameter (block 460). The system can be prevented from generating an alert, since the issue is persistent.

In scenario 406, the entities involved are static and moving/mobile entities (block 410). At T–0, one server and one client exist in the cluster (Server1, Client5) (block 430) and at T–1, one server and four clients exist in the cluster (Server1, Client1, Client2, Client3, Client4) (block 420).

In these cases, when the cluster is a combination of stable and moving entities, the entities that are associated with moving elements may be removed from the lineage determination. This may include the four clients/users that exist in a first cluster (Client1, Client2, Client3, Client4) and one client/user that exists in a second cluster (Client5). When determining the lineage and whether the rate of change exceeds the hyperparameter, the moving entities may be removed from the determination and only the stationary entities may be considered. In other words, the system may execute a machine-readable rule to analyze only stable/ stationary devices and remove the clients from the analysis, so only the servers remain (Server1). As a result, the overlap between T0 and T1 is 100% (block 440).

In scenario 406, the issue may relate to a local device problem, and the specific issue is associated with a hyperparameter of 20%. The overlap value is compared to the hyperparameter (e.g., 20%) to identify the device issue (block 450). The system determines that a persistent lineage exists if the overlap value exceeds the hyperparameter (block 460), preventing an alert as the issue is persistent.

Figure 5:
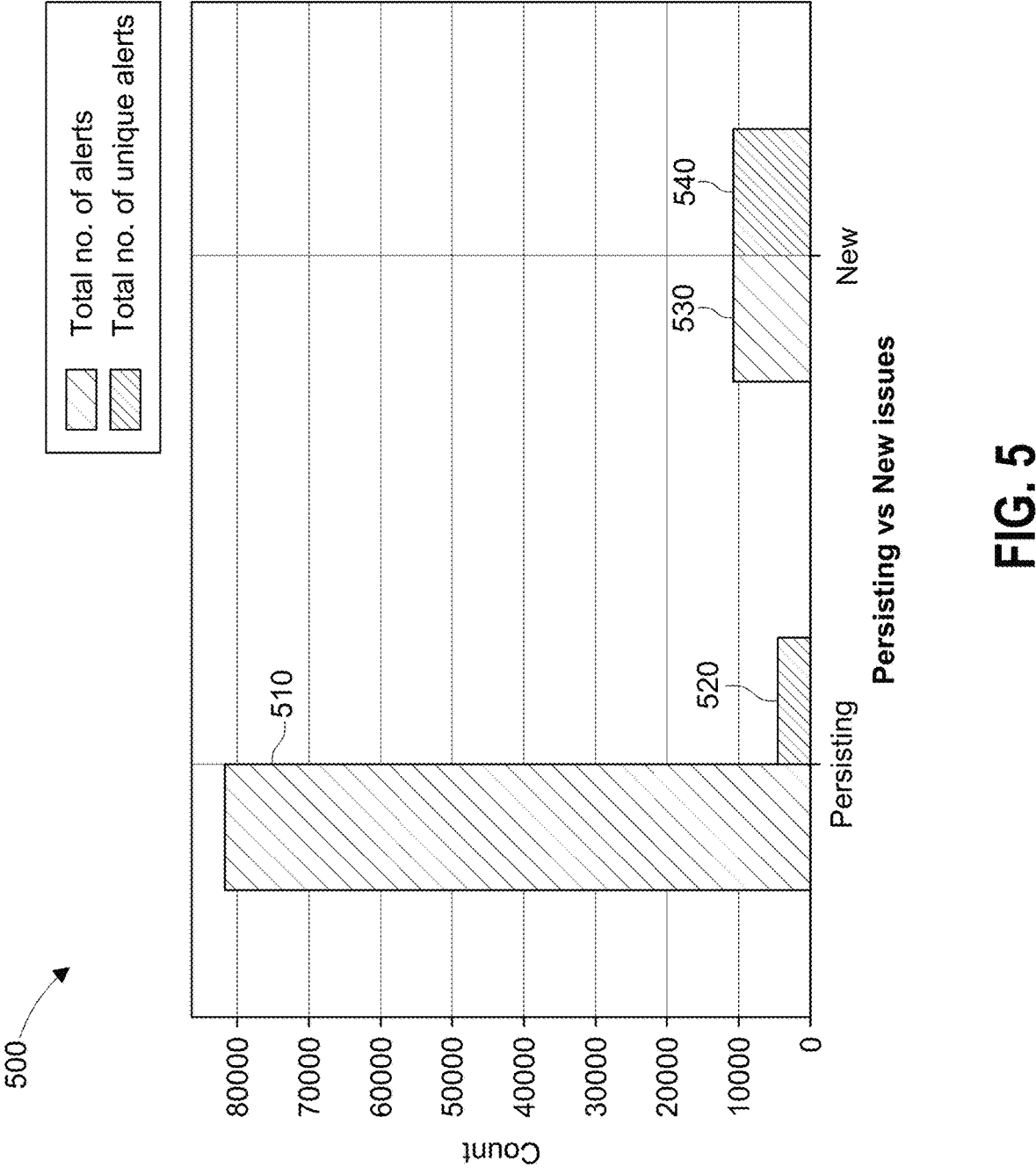
FIG. 5 illustrates the reduction in occurrences of failures detected by creating a lineage overtime, in accordance with some examples of the disclosure.

FIG. 5 illustrates the reduction in occurrences of failures detected by creating a lineage overtime, in accordance with some examples of the disclosure. In example 500, clusters of entities having a persistent lineage and a new lineage are illustrated. This example compares unique events identified by an anomaly detection algorithm and repeated events. FIG. 5 demonstrates how the system uses a greedy search and identified types of alerts. Datasets 510, 530 show the number of events/alerts, and datasets 520, 540 represent unique events/alerts identified as part of persistent or new lineages. This example highlights a reduction in alerts by grouping events related to the same ongoing problem over time.

As described herein, a unique event may be an issue experienced by a cluster of entities that the cluster of entities has not experienced within a threshold amount of time. The unique events may correspond with a new lineage for the cluster. A repeated event may be an issue experienced by the cluster of entities that is iteratively experienced within the threshold amount of time. The repeated events may correspond with a persistent lineage.

In dataset 510, a number of events that are identified from an anomaly detection algorithm and a corresponding alert that is generated for each event at the predetermined time value (e.g., every five minutes). In dataset 520, a number of alerts are analyzed for being unique or repeated. Particularly, in persistent lineages, the number of unique alerts is significantly different to the number of alerts sent and exceeds a repeated alert threshold over time.

In dataset 530, a number of events that are identified from an anomaly detection algorithm and a corresponding alert that is generated for each event at the predetermined time value (e.g., every five minutes). In dataset 540, a number of alerts are analyzed for being unique or repeated. Particularly, in new lineages, the number of unique alerts is significantly similar to the number of alerts sent and does not exceed a repeated alert threshold over time.

Figure 6:
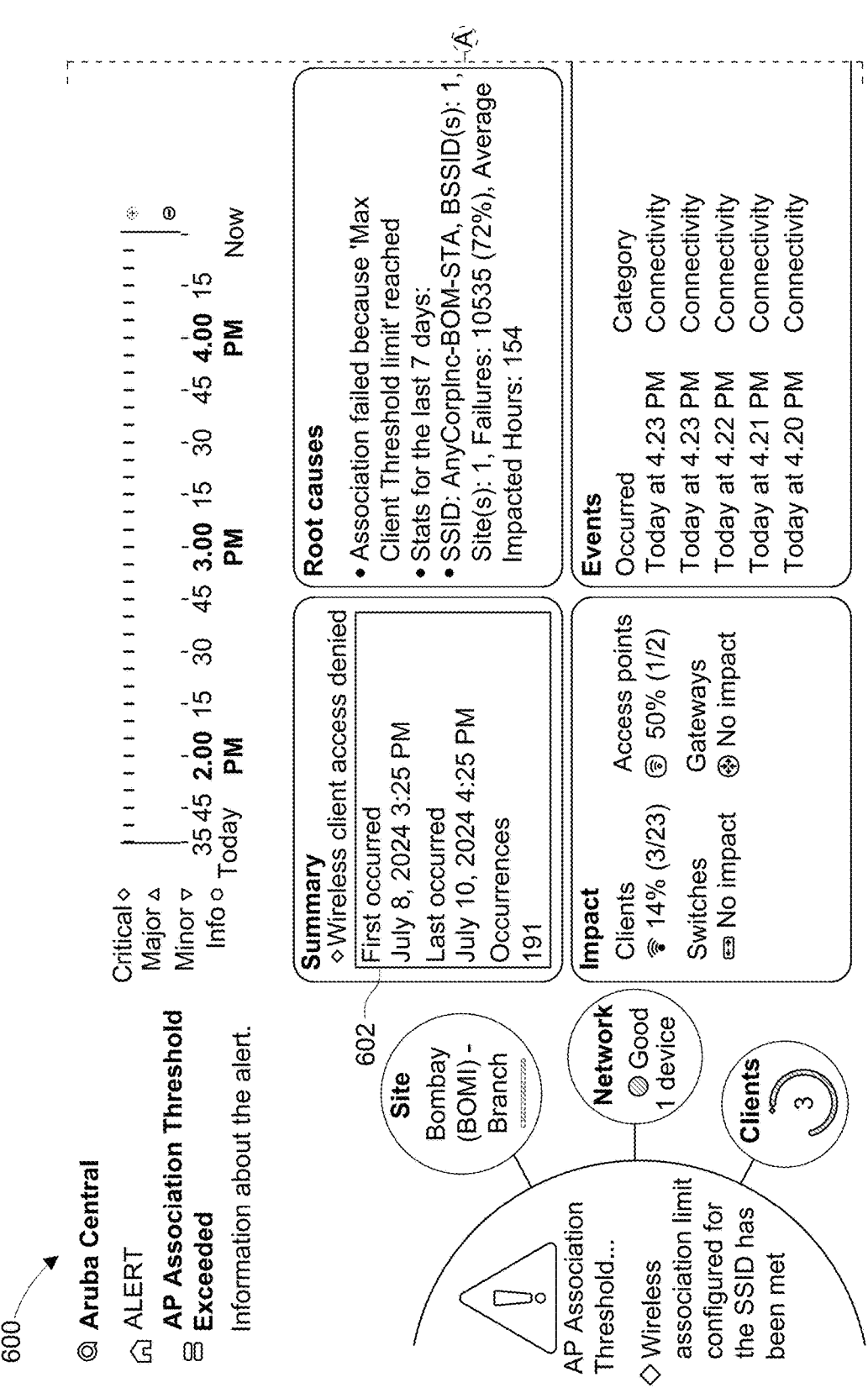
FIG. 6 illustrates a user interface summarizing the failures detected and their history overtime, in accordance with some examples of the disclosure.
Figure 6:
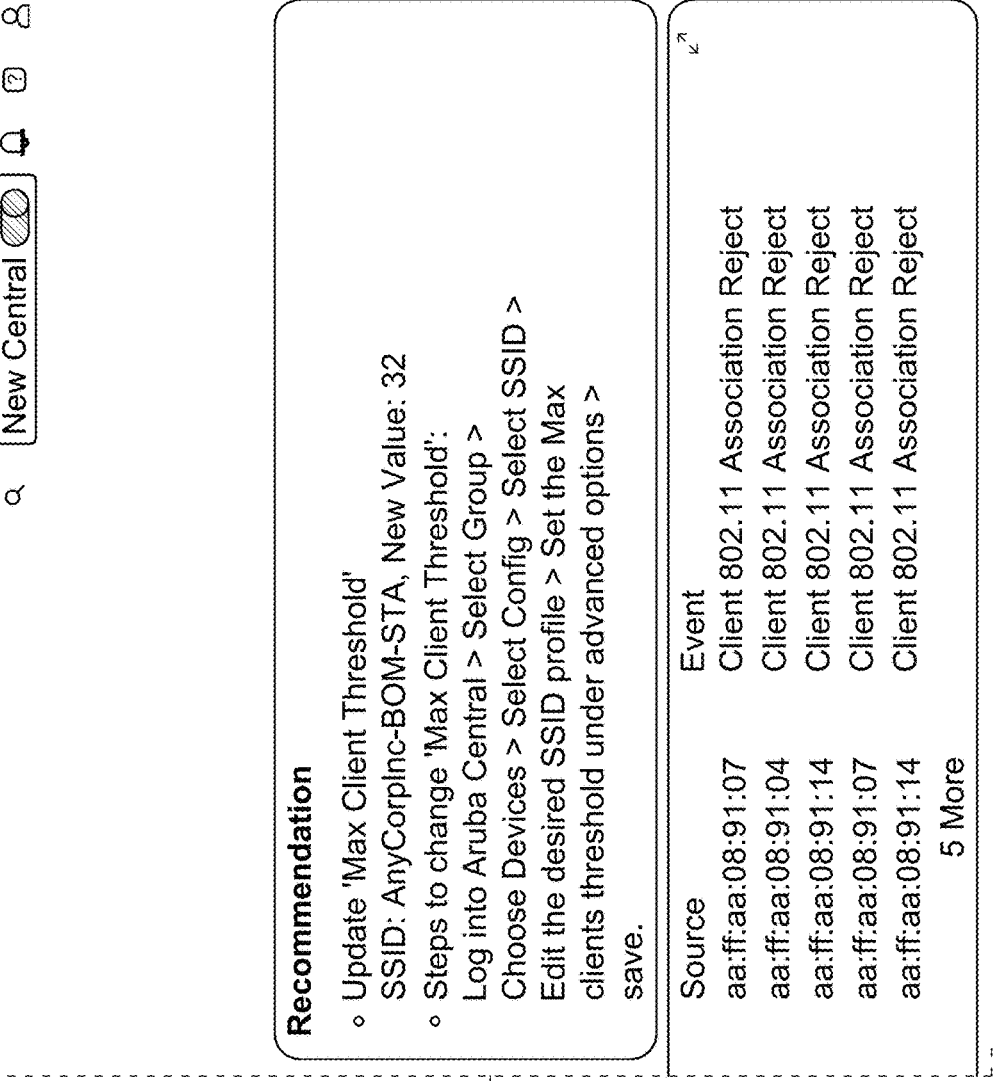

FIG. 6 illustrates a user interface summarizing the failures detected and their history overtime, in accordance with some examples of the disclosure. In example 600, a user interface is shown. At block 602, a summary of the events corresponding with the new lineages is illustrated and any alert corresponding with persistent lineages is restricted or suppressed at the user interface.

The terms "optimize," "optimal," and similar terms, as used herein, refer to making performance as effective as possible under the circumstances. While perfection cannot always be achieved, these terms encompass improving performance beyond what other settings or parameters can achieve. In some examples, these terms can also encompass making or achieving performance as good or effective as possible or practical under the given circumstances, or making or achieving performance better than that which can be achieved with other settings or parameters.

FIG. 7 illustrates a computing component that may be used to implement a lineage-based classification of network events, in accordance with various examples of the disclosed technology. In FIG. 7, computing component 700 may be a server computer, controller, or similar computing device capable of processing data. Hardware processor 702 retrieves and executes instructions stored in machine-readable storage medium 704 to control processes for classifying network events by lineage.

Hardware processor 702 may be one or more central processing units (CPUs), semiconductor-based micropro-cessors, and/or other hardware devices suitable for retrieval and execution of instructions stored in machine-readable storage medium 704. Hardware processor 702 may fetch, decode, and execute instructions, such as instructions 704-712, to control processes or operations for a lineage-based classification of network events. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-716.

Hardware processor 702 may execute instruction 706 to identify a first feature. In some examples, the first feature relates to groups or clusters of entities that share common connection issues.

Hardware processor 702 may execute instruction 708 to determine a first cluster of entities related by the first feature (e.g., using a greedy algorithm). The cluster of entities may be devices that are stationary or mobile that are experiencing the same connection issue or other feature.

The first feature may be similar to a second feature of a second cluster of entities. For example, while the first cluster of entities are mobile devices that connect to a first base station/location on a particular day, the second cluster of entities are mobile devices that connect to a second base station/location on the same day. These two clusters of entities may be similar based on their features (e.g., connection to base stations/locations and both experiencing connection issues).

Hardware processor 702 may execute instruction 710 to determine a set of events that the first cluster of entities and the second cluster of entities are experiencing. In some examples, the set of events comprise a first time value and a second time value. Once clusters of devices are identified, processor 702 may create a timeline or "lineage" of events that these clusters are experiencing. For instance, features may be shared in common in each cluster over time and reference a lineage that shows similar features.

Hardware processor 702 may execute instruction 712 to determine a rate of change of the set of events by comparing the cluster of entities for the set of events at the first time value and the second time value. For example, the initial clusters may be matched with additional clusters based on these shared features to form a lineage for an ongoing issue. If a second set of entities is experiencing a similar sequence of events as the first set and both share similar features, processor 702 can group these sets into a larger cluster of devices and determine that there is a shared issue based on the common features over the time period. Processor 702 can generate an assessment of the network clusters using incremental analysis over a time series of data (e.g., 5-minute datasets) that shows failures or events experienced across the network devices. Lineages can be created over time by analyzing the features of failures detected in the system.

Hardware processor 702 may execute instruction 714 to initiate an action. The action may be initiated upon determining that the rate of change is less than a specific hyperparameter defined for the first feature. For example, processor 702 may update a user interface to display lineage information, distinguishing between "new" and "persistent" issues. The action may be initiated when the alert is a new issue. The user interface may also present other failure event details, including root causes or a recommendation engine for resolving the issue.

Hardware processor 702 may execute instruction 716 to prevent an action. The action may be prevented upon determining that the rate of change is greater than the specific hyperparameter associated with the first feature or the second feature. When an issue is persistent, a failure alert may have already been sent within a set time frame and processor 702 may prevent resenting the alert (e.g., redundant alerts).

In some examples, a redundant alert is an alert that identifies an existing issue that is provided in excess of a threshold value within a period of time. The threshold value and period of time may be tunable by the user (e.g., user-defined values). In some examples, processor 702 prevents the action of transmitting the alerts to limit a number of alert notifications for an existing issue that identify the same issue and that exceed a threshold value.

FIG. 8 depicts a block diagram of an example computer system 800 in which various examples of the disclosed technology described herein may be implemented. Computer system 800 includes bus 802 or other communication mechanism for communicating information, one or more hardware processors 804 coupled with bus 802 for processing information. Hardware processor(s) 804 may be, for example, one or more general purpose microprocessors.

Computer system 800 also includes main memory 806, such as a random access memory (RAM), cache and/or other dynamic storage devices, coupled to bus 802 for storing information and instructions to be executed by processor

804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk, optical disk, or USB thumb drive (Flash drive), etc., is provided and coupled to bus 802 for storing information and instructions.

Computer system 800 may be coupled via bus 802 to display 812, such as a liquid crystal display (LCD) (or touch screen), for displaying information to a computer user. This information may include details about devices in each cluster, changes in lineages over time, or summaries of issues related to actions taken, among other data.

Computer system 800 may include a user interface module to implement a GUI to provide to display 812. The user interface module may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interruptions. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing device, for execution by the computing device. Software instructions may be embedded in firmware, such as EPROM. It will be further appreciated that hardware components may be comprised of connected logic units, such as gates and flip-flops, and/or may be comprised of programmable units, such as programmable gate arrays or processors.

Computer system 800 can implement the disclosed techniques using customized hard-wired logic, one or more ASICs or FPGAs, firmware and/or program logic which in combination with the computer system causes or programs computer system 800 to be a special-purpose machine. According to one example of the disclosed technology, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative configurations, hard-wired circuitry may complement or replace software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

A network link typically provides data communication between networks and other devices. For example, a network link may connect to a local network, an ISP, or the Internet. Signals traveling through the network and interface 818 carry the digital data to and from computer system 800, exemplifying forms of transmission media.

Computer system 800 also includes interface 818 coupled to bus 802. Interface 818 provides a two-way data communication coupling to one or more network links that are connected to one or more local networks. For example, interface 818 may be an integrated services digital network (ISDN) card, cable modem, satellite modem, or a modem to provide a data communication connection to a corresponding type of telephone line. As another example, interface 818 may be a local area network (LAN) card to provide a data communication connection to a compatible LAN (or WAN component to communicate with a WAN). Wireless links may also be implemented. In any such implementation, interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 818, which carry the digital data to and from computer system 800, are example forms of transmission media.

Computer system 800 can send messages and receive data, including program code, through the network(s), network link and interface 818. In the Internet example, a server might transmit a requested code for an application program through the Internet, the ISP, the local network and interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently or in combination, with different combinations and sub-combinations intended to fall within the scope of this disclosure. In some implementations, certain method or process steps may be omitted. The methods and processes described are not restricted to any particular sequence; the steps can be performed in alternative sequences, in parallel, or in other suitable ways. Additionally, steps may be added to or removed from the disclosed examples. Some operations or processes may be distributed across multiple computer systems or processors, potentially deployed on several machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:

identifying a first feature by filtering telemetry datasets using feature vectors to group entities that share a feature value corresponding to the first feature, and referencing a feature library to identify shared feature values;

determining a first cluster of entities related by the first feature, the first feature being similar to a second feature of a second cluster of entities based on shared feature values identified via the feature library;

determining a set of events that the first cluster of entities and the second cluster of entities are experiencing, the set of events comprising a first time value and a second time value by analyzing time-series telemetry captured at the first time value and the second time value to identify events associated with the first cluster and the second cluster;

determining a rate of change of the set of events by computing a membership-overlap metric between entities in the first cluster at the first time value and entities in the first cluster at the second time value and comparing the metric to a hyperparameter defined for the first feature;

determining that the rate of change is less than a specific hyperparameter defined for the first feature, and initiating an action comprising updating a user interface to present a new lineage increasing visibility of new issues, and providing failure event details;

determining that the rate of change is greater than the specific hyperparameter associated with the first feature or the second feature, and preventing the action by suppressing redundant alerts for a persistent lineage that exceed a threshold within a time period to limit a number of redundant alert notifications for an existing issue that identify the same issue and that exceed a threshold value; and leveraging historical data to refine alerts and improve accuracy of fault element identification.

2. The computer-implemented method of claim 1, wherein the first cluster of entities that operate in a communication network are entities that remain stationary in the communication network.

3. The computer-implemented method of claim 1, wherein the first cluster of entities that operate in a communication network that are moving in the communication network.

4. The computer-implemented method of claim 1, wherein the first cluster of entities that operate in a communication network are a combination of moving and stationary entities in the communication network.

5. The computer-implemented method of claim 1, wherein the set of events is determined at a pre-determined time value, and the pre-determined time value is tunable by a client device.

6. The computer-implemented method of claim 1, wherein the set of events is determined at a user-defined time value, and the user-defined time value limits the events in datasets to the events occurring during the user-defined time value.

7. The computer-implemented method of claim 1, wherein the action comprises generating and transmitting an alert notification to a client device of a new issue in a communication network, and wherein the first cluster of entities operate in the communication network with the client device.

8. A computer system comprising:
a memory storing instructions; and
a processor communicatively coupled to the memory and configured to execute the instructions to:
identify a first set of features by filtering telemetry datasets using feature vectors to group entities that share feature values corresponding to the first set of features, and referencing a feature library to identify shared feature values;
determine a first cluster of entities related by the first set of features, the first set of features being similar to a second set of features of a second cluster of entities based on shared feature values identified via the feature library;
determine a set of events that the first cluster of entities and the second cluster of entities are experiencing, the set of events comprising a first time value and a second time value by analyzing time-series telemetry captured at the first time value and the second time value to identify events associated with the first cluster and the second cluster;
determine a rate of change of the set of events by comparing the cluster of entities for the set of events at the first time value and the second time value;
determine that the rate of change is less than a specific hyperparameter defined for the first set of features, and initiate an action comprising updating a user interface to present a new lineage increasing visibility of new issues, and providing failure event details; and
determine that the rate of change is greater than the specific hyperparameter associated with the first set of features or the second set of features, and prevent the action by suppressing redundant alerts for a persistent lineage that exceed a threshold within a time period to limit a number of redundant alert notifications for an existing issue that identify the same issue and that exceed a threshold value; and
leverage historical data to refine alerts and improve accuracy of fault element identification.

9. The computer system of claim 8, wherein the first cluster of entities that operate in a communication network are entities that remain stationary in the communication network.

10. The computer system of claim 8, wherein the first cluster of entities that operate in a communication network that are moving in the communication network.

11. The computer system of claim 8, wherein the first cluster of entities that operate in a communication network are a combination of moving and stationary entities in the communication network.

12. A non-transitory computer-readable storage medium storing a plurality of instructions executable by a processor, the plurality of instructions when executed by the processor cause the processor to:

identify a first feature by filtering telemetry datasets using feature vectors to group entities that share a feature value corresponding to the first feature, and referencing a feature library to identify shared feature values;

determine a first cluster of entities related by the first feature, the first feature being similar to a second feature of a second cluster of entities based on shared feature values identified via the feature library;

determine a set of events that the first cluster and the second cluster are experiencing, the set of events comprising a first time value and a second time value by analyzing time-series telemetry captured at the first time value and the second time value to identify events associated with the first cluster and the second cluster;

determine a rate of change of the set of events by comparing the cluster of entities for the set of events at the first time value and the second time value by computing a membership-overlap metric between entities in the first cluster at the first time value and entities in the first cluster at the second time value and comparing the metric to a hyperparameter defined for the first feature;

determine that the rate of change is less than a specific hyperparameter defined for the first feature, and initiate an action comprising updating a user interface to present a new lineage increasing visibility of new issues, and providing failure event details;

determine that the rate of change is greater than the specific hyperparameter associated with the first feature or the second feature, and prevent the action by suppressing redundant alerts for a persistent lineage that exceed a threshold within a time period to limit a number of redundant alert notifications for an existing issue that identify the same issue and that exceed a threshold value; and leverage historical data to refine alerts and improve accuracy of fault element identification.

13. The non-transitory computer-readable storage medium of claim 12, wherein the first cluster of entities that operate in a communication network are entities that remain stationary in the communication network.

14. The non-transitory computer-readable storage medium of claim 12, wherein the first cluster of entities that operate in a communication network that are moving in the communication network.

15. The non-transitory computer-readable storage medium of claim 12, wherein the first cluster of entities that operate in a communication network are a combination of moving and stationary entities in the communication network.

16. The non-transitory computer-readable storage medium of claim 12, wherein the set of events is determined at a pre-determined time value, and the pre-determined time value is tunable by a client device.

* * * * *